(12) United States Patent
Chen et al.

(10) Patent No.: US 11,253,851 B2
(45) Date of Patent: Feb. 22, 2022

(54) INITIAL POSITIONING SYSTEM AND METHOD FOR LIQUID MEASURING AND REMOVING

(71) Applicants: Zengxin Chen, Beijing (CN); Changchun Zhou, Beijing (CN); Shenglu Li, Beijing (CN); Jingzhe Chen, Beijing (CN); Bin Chen, Beijing (CN); Chen Li, Beijing (CN); Hao Wei, Beijing (CN)

(72) Inventors: Zengxin Chen, Beijing (CN); Changchun Zhou, Beijing (CN); Shenglu Li, Beijing (CN); Jingzhe Chen, Beijing (CN); Bin Chen, Beijing (CN); Chen Li, Beijing (CN); Hao Wei, Beijing (CN)

(73) Assignee: BEIJING RED-SEA TECH CO., LTD., Beijing (CN)

( * ) Notice: Subject to any disclaimer, the term of this patent is extended or adjusted under 35 U.S.C. 154(b) by 0 days.

(21) Appl. No.: 16/876,124

(22) Filed: May 18, 2020

(65) Prior Publication Data
US 2020/0353458 A1 Nov. 12, 2020

Related U.S. Application Data

(63) Continuation of application No. PCT/CN2018/116282, filed on Nov. 19, 2018.

(30) Foreign Application Priority Data

Nov. 17, 2017 (CN) .......................... 201711148827.7
Nov. 17, 2017 (CN) .......................... 201721543030.2

(51) Int. Cl.
*G01F 19/00* (2006.01)
*B01L 3/02* (2006.01)

(52) U.S. Cl.
CPC ............ *B01L 3/0293* (2013.01); *G01F 19/00* (2013.01); *B01L 2200/0605* (2013.01)

(58) Field of Classification Search
CPC . B01L 3/0293; B01L 2200/0605; G01F 19/00
See application file for complete search history.

(56) References Cited

U.S. PATENT DOCUMENTS 4,886,189 A * 12/1989 Vanderjagt ........... B67D 7/0255
222/49
10,260,925 B2 * 4/2019 Chen ....................... G01F 11/28
(Continued)

FOREIGN PATENT DOCUMENTS

CN 105730891 A * 7/2016

*Primary Examiner* — Jamel E Williams
(74) *Attorney, Agent, or Firm* — George Guosheng Wang; United States Research and Patent Finn

(57) ABSTRACT

An initial positioning system and method for liquid measuring and taking. The system comprises a measuring passage, a variable pressure chamber, and a piston, an initial end of the measuring passage being in communication with the upper part of the variable pressure chamber; the piston reciprocates in the variable pressure chamber to cause a change between positive pressure and negative pressure in the variable pressure chamber; the initial positioning system further comprises a pressure relief port located on the wall of the variable pressure chamber and capable of communicating with the outside of the variable pressure chamber; when the piston is located at the pressure relief port, and the inside and outside of the variable pressure chamber are in communication, the maximum volume of the liquid that can be accommodated in the variable pressure chamber is not smaller than one third of the total volume of the variable pressure chamber.

8 Claims, 6 Drawing Sheets

(56) References Cited

U.S. PATENT DOCUMENTS

| | | | |
|---|---|---|---|
| 2012/0308409 A1* | 12/2012 | Levine | F04B 19/22 417/274 |
| 2014/0326757 A1* | 11/2014 | Chen | B65D 83/42 222/209 |
| 2015/0183570 A1* | 7/2015 | Chen | B65D 25/28 220/661 |
| 2015/0240959 A1* | 8/2015 | Chen | F16K 15/02 222/1 |
| 2016/0002023 A1* | 1/2016 | Chen | B67D 7/36 222/1 |
| 2018/0172496 A1* | 6/2018 | Chen | B65D 83/00 |

* cited by examiner

INITIAL POSITIONING SYSTEM AND METHOD FOR LIQUID MEASURING AND REMOVING

BACKGROUND

Technical Field

The present invention relates to an initial positioning system for liquid measuring and taking, a tool and a container using the initial positioning system for liquid measuring and taking, and an initial positioning method for liquid measuring, and taking.

Related Art

When people use liquids in life, they often need to accurately measure the volume of the liquids. The liquids include various reagents, liquid pesticides, chemical raw materials, washing liquids, disinfectants, edible oils and liquid medicines. They are usually measured and taken by using measuring tools such as measuring cylinders, measuring cups and pipettes. There are many disadvantages in the use of traditional measuring tools. For example, liquids are wasted and polluted due to their contact with measuring tools, toxic liquids volatilize; liquids are oxidized in the air; the measurement accuracy is affected due to a loss during transfer, etc. In recent years, new technologies such as self-measuring containers have been used to solve the above problems. By using the self-measuring containers to hold these liquids, it is not necessary to use an external measuring tool to take the liquids, which avoids the above disadvantages.

However, when the existing self-measuring containers are used to measure and take a liquid, it is difficult to determine an initial position of the liquid in a measuring channel due to factors such as an, operation force, an operation speed, the volume of the liquid in a container body, and the volume of air in a variable-pressure part. If the initial measuring position is not determined, both the measurement accuracy and the convenience of operation will be affected. All these have hindered the widespread application of the self-measuring containers.

Therefore, an initial positioning system and method for liquid measuring and taking are needed to keep a liquid measuring and taking tool and container sensitive to manipulation, ensure accurate and convenient taking and protect the liquid to be measured and taken from external air or impurities.

SUMMARY

In order to solve the above-mentioned problems in the prior art, the present invention provides an initial positioning system for liquid measuring and taking.

The initial positioning system includes a measuring channel, a variable-pressure chamber and a piston. An initial end of the measuring channel communicates with an upper part of the variable-pressure chamber. The piston reciprocates in the variable-pressure chamber to generate a positive pressure alternating with a negative pressure in the variable-pressure chamber. The initial positioning system further includes a pressure relief port located on, a wall of the variable-pressure chamber and communicating with the outside of the variable-pressure chamber. The piston can move across the pressure relief port when reciprocating. When the piston is located at the pressure relief port and the inside and outside of the variable-pressure chamber are communicated, a maximum volume of a liquid in the variable-pressure chamber is not less than one-third total volume of the variable-pressure chamber. When the piston moves outward to generate a negative pressure in the variable-pressure chamber, the liquid in the measuring channel flows toward the variable-pressure chamber and passes through the initial position to enter into the variable-pressure chamber. When the piston is at or over the pressure relief port, air outside the variable-pressure chamber enters into the variable-pressure chamber from the pressure relief port. When the piston moves inward across the pressure relief port to generate a positive pressure in the variable-pressure chamber, a liquid in the measuring channel flows outward, and air in the variable-pressure chamber or the air and the liquid in the variable-pressure chamber enter into the measuring channel. An outflow volume of the liquid is calculated by a distance moved by a liquid-air interface from the initial position since the beginning of the positive pressure.

The initial positioning system allows an excess liquid to enter into the variable-pressure chamber by the reciprocating piston in the variable-pressure chamber. In this way, the initial positioning system realizes the filling, positioning, measurement and taking of the liquid in the measuring channel. The initial positioning system is simple to operate and convenient for measuring. The taking process does not use an external tool, which prevents the liquid from waste, pollution, oxidation, volatilization and moisture. The pressure relief port allows a certain amount of air to exist in the variable-pressure chamber, ensuring the existence of a visible liquid-air interface in the measuring channel. The liquid in the variable-pressure chamber is not less than one-third volume thereof, which prevents a delayed response due to too much air in the variable-pressure chamber and improves the measurement and taking sensitivity.

In the initial positioning system for liquid measuring and taking, there may be one variable-pressure chamber, and the piston is located on a level side or an oblique lower side of the variable-pressure chamber. The pressure relief port is located at a middle or upper part of a level of the variable-pressure chamber. In the simple single variable-pressure chamber structure, the piston is located on a level side or an oblique lower side of the variable-pressure chamber, and the pressure relief port is located at a middle or upper part of a level of the variable-pressure chamber With this structure, the initial positioning system allows the variable-pressure chamber to store a large amount of liquid and realizes the functional requirements of initial positioning and excess return.

In the initial positioning system for liquid measuring and taking, the pressure relief port is provided with a valve opened under a certain pressure. The valve opened under a certain pressure at the pressure relief port allows the variable-pressure chamber to store a certain amount of liquid while meeting different design requirements.

In the initial positioning system for liquid measuring and taking, the pressure relief port communicates with a tube opened outside the variable-pressure chamber; the other end of the tube is opened at a level of the middle or upper part of the variable-pressure chamber. The communication design also allows the variable-pressure chamber to store a certain amount of liquid.

In the initial positioning system for liquid measuring and taking, the variable-pressure chamber is two or more, and the piston is located on a lower side or an oblique lower side of the variable-pressure chamber. The setting of two or more variable-pressure chambers is to allow some of the variable-pressure chambers to store an excess liquid during the change of the pressure to prevent a delayed response caused by too much air in the variable-pressure chamber. In this way, the initial positioning system improves the measurement and taking sensitivity.

Further, in the initial positioning system for liquid measuring and taking, one of the variable-pressure chambers is provided with the pressure relief port. The setting of the pressure relief port in part of the variable-pressure chambers allows a certain amount of air in the variable-pressure chamber to ensure the existence of a visible liquid-air interface in the measuring channel.

In the initial positioning system for liquid measuring and taking, when the piston is located at the pressure relief port and the inside and outside of the variable-pressure chamber are communicated, a maximum volume of the liquid in the variable-pressure chamber is not less than one-third total volume of the variable-pressure chamber. Further, when the piston is located at the pressure relief port and the inside and outside of the variable-pressure chamber are communicated, a maximum volume of the liquid in, the variable-pressure chamber is not less than 90% total volume of the variable-pressure chamber. In general, a higher proportion of liquid in the variable-pressure chamber indicates a higher measurement and taking sensitivity. However, too little air in the variable-pressure chamber may cause the disadvantage that an excess liquid is mixed with the liquid in the measuring channel during pressurization.

The present invention further includes a measuring tool, including the above-mentioned initial positioning system for liquid measuring and taking. The present invention further includes a measuring container, including the above-mentioned initial positioning system for liquid measuring and taking. The measuring tool and container including the above-mentioned initial positioning system have the advantages of the initial positioning system, such as sensitive response, simple operation, convenient positioning and measurement, and prevention of liquid waste, pollution, oxidation, volatilization and moisture.

The present invention further includes an initial positioning method for liquid measuring and taking, including the following steps:

A. pulling a piston in a variable-pressure chamber outward to generate a negative pressure in the variable-pressure chamber; applying the negative pressure of the variable-pressure chamber to a measuring channel communicating with an upper part thereof, so that a liquid to be taken enters into the measuring channel, and air in the measuring channel or the liquid and the air in the measuring channel enter into the variable-pressure chamber;

B. filling the measuring channel with the liquid to be taken, and allowing an excess liquid to pass through an initial measuring position to enter into the variable-pressure chamber;

C. stopping pulling the piston when the piston is at or over a pressure relief port on a wall of the variable-pressure chamber and the variable-pressure chamber communicates with the outside world, allowing external air to enter into the variable-pressure chamber to eliminate the negative pressure in the variable-pressure chamber and prevent the excess liquid from entering into the variable-pressure chamber, and determining the initial measuring position, allowing part of the liquid in the variable-pressure chamber to flow out from the pressure relief port and recover through a return channel;

D. pushing the piston in the variable-pressure chamber inward to move in an opposite direction across the pressure relief port to isolate the variable-pressure chamber from the outside world, when the liquid needs to be taken out, where a maximum volume of the liquid resident in the variable-pressure chamber is not less than one-third total volume of the variable-pressure chamber, not less than two-thirds total volume of the variable-pressure chamber, or not less than 90% total volume of the variable-pressure chamber;

E. continuing to push the piston to compress the variable-pressure chamber and apply a positive pressure to the measuring channel; allowing the air in the variable-pressure chamber to first enter into the measuring channel to push the liquid in the measuring channel out of the initial position; continuing to apply the positive pressure to push the liquid in the variable-pressure chamber to enter into the measuring channel and push the liquid in the measuring channel to continuously flow out; and F. calculating an outflow volume by a distance moved by a liquid-air interface from the initial position in the measuring channel since the beginning of the pressurization.

The initial positioning method for liquid measuring and taking also has the advantages such as high operation sensitivity, simple operation, convenient positioning and measurement, and prevention of liquid waste, pollution, oxidation, volatilization and moisture. The initial positioning method is suitable for daily use of ordinary residents, industrial production measurement, and precision measurement by scientific researchers. The piston can be moved by manual push and pull or by electrical drive.

DETAILED DESCRIPTION

Embodiment 1

Figure 1:
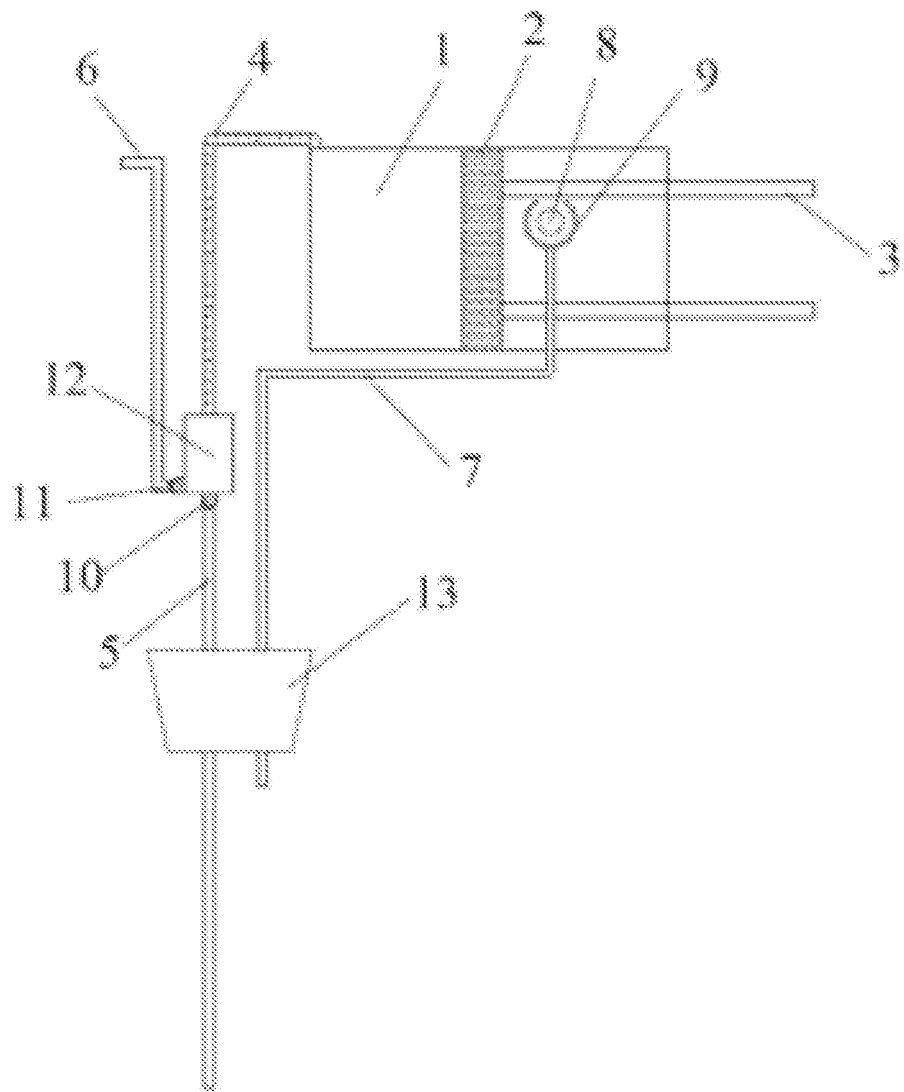
FIG. 1 is a structural diagram of a tool for liquid measuring and taking in Embodiment 1.

Embodiment 1 provides a measuring tool including an initial positioning system for liquid measuring and taking, as shown in FIG. 1. The initial positioning system of the measuring tool includes a variable-pressure chamber 1, a piston 2, an operating rod 3, a measuring channel 4 and a pressure relief port 8. The piston 2 is located on a level side of the variable-pressure chamber 1. The measuring channel 4 communicates with an upper part of the variable-pressure chamber 1. The pressure relief port 8 is located at a middle or upper part of a level of the variable-pressure chamber 1 and passes through a wall of the variable-pressure chamber 1. The piston 2 can move across the pressure relief port 8 to the right of the pressure relief port 8 when reciprocating. When the piston 2 is located at the pressure relief port 8 and the inside and outside of the variable-pressure chamber 1 are communicated, a maximum volume of the liquid in the variable-pressure chamber 1 is two thirds total volume of the variable-pressure chamber. A semi-cylindrical recovery device 9 collects and recovers a liquid overflowed from the pressure relief port 8, and returns the liquid to a liquid taking site through a return channel 7. The measuring channel 4 has a scale to display an outflow volume of the liquid according to a distance moved by a liquid-air interface from an initial end of the measuring channel 4.

The measuring channel 4 communicates with a cavity 12. The cavity 12 communicates with a liquid taking channel 5 through a check valve 10 and communicates with an outflow channel 6 through a check valve 11. The check valve 10 only allows the liquid to flow from the liquid taking channel 5 to the cavity 12, and the check valve 11 only allows the liquid to flow from the cavity 12 to the outflow channel 6. The liquid taking channel 5 and the return channel 7 pass through a stopper 13, which fixes the measuring tool to a container for holding the liquid to be taken.

When the piston 2 moves outward to generate a negative pressure in the variable-pressure chamber 1, the liquid in the measuring channel 4 flows toward the variable-pressure chamber 1 and passes through the initial position to enter into the variable-pressure chamber 1. When the piston 2 moves across the pressure relief port 8, external air enters into the variable-pressure chamber 1 from the pressure relief port 8. When the piston 2 moves inward across the pressure relief port 8 to generate a positive pressure in the variable-pressure chamber 1, the liquid in the measuring channel 4 flows outward, and the air in the variable-pressure chamber 1 or the air and the liquid in the variable-pressure chamber 1 enter into the measuring channel 4. An outflow volume of the liquid is calculated by a distance moved by the liquid-air interface from the initial position since the beginning of the positive pressure.

The measuring tool measures and takes the liquid as follows:

The operating rod 3 is pulled outward to move the piston 2 to the right and generate a negative pressure in the variable-pressure chamber 1. The check valve 11 is closed, and the liquid to be taken passes through the liquid taking channel 5, the check valve 10 and the cavity 12 to the measuring channel 4. Then the liquid flows through the initial end of the measuring channel 4 to enter into the variable-pressure chamber 1. When the piston 2 reaches the pressure relief port 8, the external air enters into the variable-pressure chamber 1, the negative pressure in the variable-pressure chamber 1 disappears, and the liquid in the liquid taking channel 5, the cavity 12 and the measuring channel 4 stops flowing. The measuring channel 4 is filled with the liquid, and the initial positioning is completed, ready for taking the liquid. Part of the liquid in the variable-pressure chamber 1 flows out from the pressure relief port 8 and is recovered, through the return channel 7.

When the liquid needs to be taken out, the operating rod 3 is pushed inward to move the piston 2 to the left. When a level of the liquid in the variable-pressure chamber 1 exceeds the pressure relief port 8, the liquid flows out from the pressure relief port 8. When the piston 2 is located at the pressure relief port 8, the maximum volume of the liquid in the variable-pressure chamber 1 is not less than two-thirds total volume of the variable-pressure chamber 1. The piston 2 is continuously pushed across the pressure relief port 8 to generate a positive pressure in the variable-pressure chamber 1. The check valve 10 is closed, and the liquid flows out through the measuring channel 4, the cavity 12, the check valve 11 and the outflow channel 6. The volume of the taken liquid is calculated by a distance moved by the liquid-air interface from the initial end of the measuring channel 4.

Because of the liquid in the variable-pressure chamber 1, the measuring tool and method are more sensitive, more convenient, faster and more accurate than a traditional liquid volume measuring tool.

Embodiment 2

Figure 2:
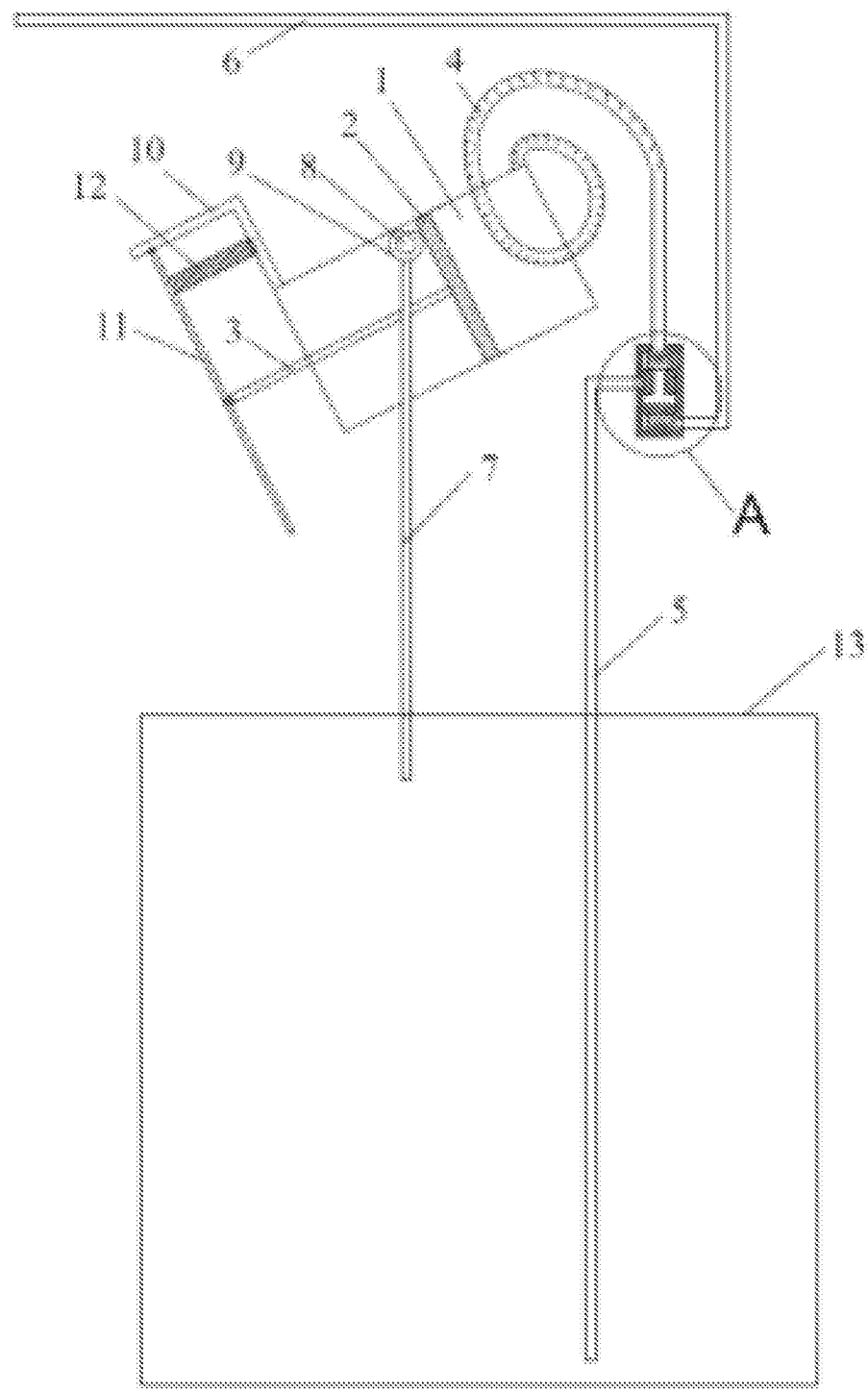
FIG. 2 is a structural diagram of a container for liquid measuring and taking in Embodiment 2.
Figure 3:
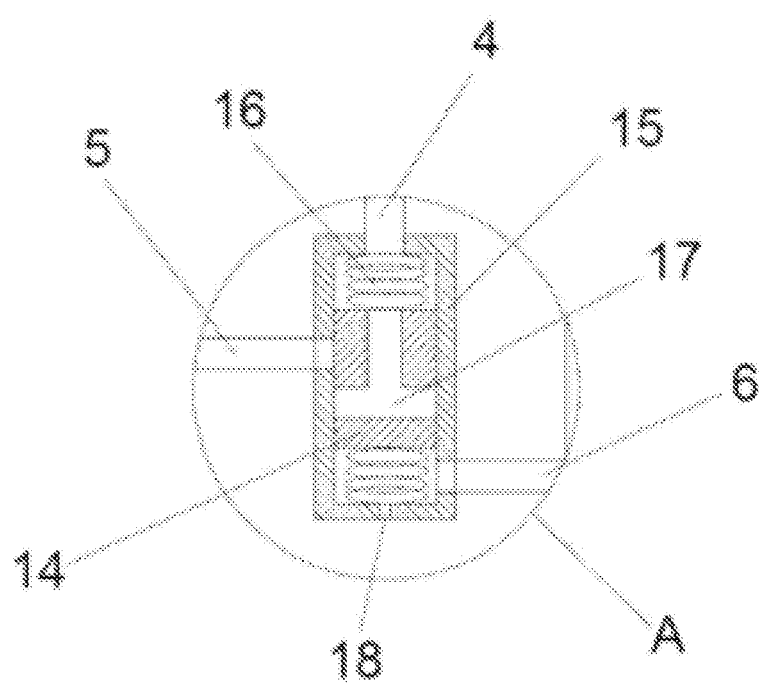
FIG. 3 is a detail drawing of A in a container for liquid measuring and taking in Embodiment 2.

Embodiment 2 provides a container for liquid measuring and taking, as shown in FIG. 2. FIG. 3 is a detail drawing of A in the container for liquid measuring and taking in Embodiment 2.

The container for liquid measuring and taking includes an initial positioning system composed of a variable-pressure chamber 1, a piston 2, a connecting rod 3, a measuring channel 4 and a pressure relief port 8. The container further includes a bowl 9 covering the outside of the pressure relief port 8, a return channel 7, a liquid taking channel 5, an outflow channel 6, a steering valve, a container body 13, and facilities for easy taking, including a bracket 10 fixed on an outer wall of the variable-pressure chamber 1, an operating rod 11 in movable connection with the bracket 10 and the connecting rod 3, and a spring 12 located between the bracket 10 and the operating rod 11.

The piston 2 is located on an oblique lower side of the variable-pressure chamber 1. The measuring channel 4 communicates with an upper part of the variable-pressure chamber 1. The pressure relief port 8 is located at a middle or upper part of a level of the variable-pressure chamber 1 and passes through a wall of the variable-pressure chamber 1. The piston 2 can move across the pressure relief port 8 to the lower left of the pressure relief port 8 when reciprocating. When the piston 2 is located at the pressure relief port 8 and the inside and outside of the variable-pressure chamber 1 are communicated, a maximum volume of the liquid in the variable-pressure chamber 1 is one-third total volume of the variable-pressure chamber. The bowel 9 collects and recovers the liquid overflowed from the pressure relief port 8, and returns the liquid to the container body 13 through the return channel 7. The measuring channel 4 has a scale to display an outflow volume of the liquid according to a distance moved by a liquid-air interface from an initial end of the measuring channel 4.

The measuring channel 4 communicates with the liquid taking channel 5 and the outflow channel 6 through the steering valve (shown at A). The steering valve includes a valve body 15, a valve piston 14, and a return spring 16. The valve piston 14 is provided with an internal channel 17. The internal channel 17 includes a vertical portion communicating with the measuring channel 4 in the middle and a lateral portion leading to a side wall of the valve piston 14. When the variable-pressure chamber 1 is under a positive pressure, the valve piston 14 moves downward and the lateral portion of the internal channel 17 communicates with an opening of the outflow channel 6 on the valve body 15. When the variable-pressure chamber 1 is under a negative pressure, the valve piston 14 moves upward and the lateral portion of the internal channel 17 communicates with an opening of the liquid taking channel 5 on the valve body 15. When there is no pressure, the return spring 16 causes the valve piston 14 to stay at an intermediate position and the lateral portion of the internal channel 17 does not communicate with the liquid taking channel 5 or the outflow channel 6. An opening 18 allows the valve piston 14 to move smoothly up and down in a cavity of the valve body 15.

The measuring container measures and takes the liquid as follows:

1. The operating rod 11 stops moving to the upper right. The spring 12 pushes the operating rod 11 to the lower left, and the connecting rod 3 and the piston 2 are driven to move downward to the lower left to generate a negative pressure in the variable-pressure chamber 1. The variable-pressure chamber 1 applies the negative pressure to the measuring channel 4 communicating with the upper part thereof. The lateral portion in the internal channel 17 of the valve piston 14 communicates with the liquid taking channel 5. The liquid to be taken enters into the measuring channel 4, and air in the measuring channel 4 or the liquid and the air in the measuring channel 4 enter into the variable-pressure chamber 1.

2. The measuring channel 4 is filled with the liquid to be taken, and an excess liquid passes through the initial position of the measuring channel 4 to enter into the variable-pressure chamber 1.

3. When the piston 2 reaches the pressure relief port 8 on the wall of the variable-pressure chamber 1, the variable-pressure chamber 1 communicates with the outside world to eliminate the negative pressure in the variable-pressure chamber 1. The lateral portion in the internal channel 17 of the valve piston 14 is disconnected from the liquid taking channel 5. The excess liquid does not enter into the variable-pressure chamber 1, and the initial measuring position is determined Part of the liquid in the variable-pressure chamber 1 flows out from the pressure relief port 8, and is recovered into the container body 13 through the return channel 7.

4. When the liquid needs to be taken out, the operating rod 11 is pressed to move the connecting rod 3 and the piston 2 in the variable-pressure chamber 1 to the upper right. The piston 2 moves in an opposite direction across the pressure relief port 8 to isolate the variable-pressure chamber 1 from the outside world. At this time, a maximum volume of the liquid in the variable-pressure chamber 1 is not less than one-third total volume of the variable-pressure chamber.

5. The operating rod 11 is continuously pressed to push the piston 2 to compress the variable-pressure chamber 1 and apply a positive pressure to the measuring channel 4. The lateral portion in the internal channel 17 of the valve piston 14 communicates with the outflow channel 6. The air in the variable-pressure chamber 1 first enters into the measuring channel 4, and the liquid in the measuring channel 4 is pushed to flow out from the initial position. The positive pressure is continuously applied, so that the liquid in the variable-pressure chamber 1 enters into the measuring channel 4, and the liquid in the measuring channel 4 is pushed to continuously flow out.

6. An outflow volume is calculated by a distance moved by a liquid-air interface from the initial position in the measuring channel 4 since the beginning of the pressurization.

The measuring container is sensitive, convenient, fast and accurate.

Embodiment 3

Figure 4:
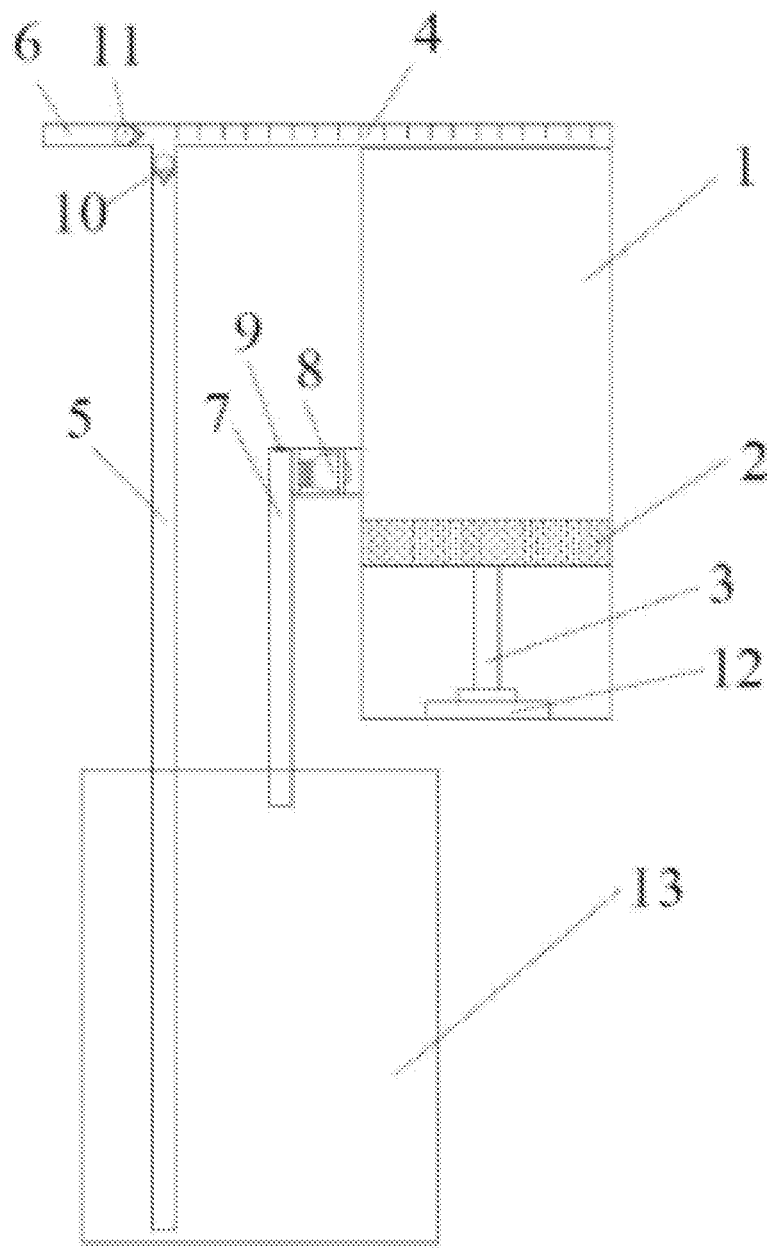
FIG. 4 is a structural diagram of a liquid container in Embodiment 3.

Embodiment 3 provides a container for liquid measuring and taking, as shown in FIG. 4. The container for liquid measuring and taking includes an initial positioning system composed of a variable-pressure chamber 1, a piston 2, a connecting rod 3, a measuring channel 4 and a pressure relief port 8. The pressure relief port is provided with a valve opened under a certain pressure. The container further includes a return channel 7, a liquid taking channel 5 and an internal check valve 10 thereof, an outflow channel 6 and an internal check valve 11 thereof, a container body 13, and an electric device 12 connected to the connecting rod 3. The return channel is connected outside the pressure relief port 8, and an upper part of the return channel 7 is provided with an opening 9.

The piston 2 is located at a lower side of the variable-pressure chamber 1. The measuring channel 4 communicates with an upper right part of the variable-pressure chamber 1. The pressure relief port 8 is located at a lower part of a level of the variable-pressure chamber 1, and passes through a wall of the variable-pressure chamber 1. The piston 2 can move across the pressure relief port 8 to reach below the pressure relief port 8 when reciprocating. The pressure relief port 8 is provided with a valve opened under a certain pressure. When a level of the liquid in the variable-pressure chamber 1 is higher than a one-third distance from the pressure relief port 8 to the top of the variable-pressure chamber 1, the valve is opened under pressure. External air enters into the variable-pressure chamber 1, and part of the liquid in the variable-pressure chamber 1 returns into the container through the pressure relief port 8 and the return channel 7. When the level of the liquid in the variable-pressure chamber 1 is lower than the one-third distance from the pressure relief port 8 to the top of the variable-pressure chamber 1, the valve is closed. The opening 9 in the upper part of the return channel 7 makes a pressure outside the pressure relief port 8 zero to prevent the liquid in the return channel 7 from affecting the valve in the pressure relief port 8 to open by mistake. The liquid taking channel 5 and the internal check valve 10 thereof can be opened unidirectionally upward, and the outflow channel 6 and the internal check valve 11 thereof can be unidirectionally opened leftward. The electric device 12 connected to the connecting rod 3 can be controlled by a panel to drive the piston 2 to reciprocate by the connecting rod 3.

When the piston 2 is located at the pressure relief port 8 and the inside and outside of the variable-pressure chamber 1 are communicated, a maximum volume of the liquid in the variable-pressure chamber 1 is more than one-third total volume of the variable-pressure chamber. At this time, a smaller air volume in the variable-pressure chamber 1 will lead to a more sensitive reciprocation of the liquid in the measuring channel 4 along with the piston. The liquid flowing out from the pressure relief port 8 returns into the container body 13 through the return channel 7. The measuring channel 4 has a scale to display an outflow volume of the liquid according to a distance moved by a liquid-air interface from an initial end in the right of the measuring channel 4.

The measuring container measures and takes the liquid as follows:

1. When the piston 2 is located above the pressure relief port 8, the electric device 12 is turned on. The connecting rod 3 drives the piston 2 to move downward to generate a negative pressure in the variable-pressure chamber 1. The variable-pressure chamber 1 applies the negative pressure to the measuring channel 4 communicating with the upper right thereof. The check valve 10 is opened, and the liquid to be taken enters into the measuring channel 4 through the liquid taking channel 5. The air in the measuring channel 4 or the liquid and the air in the measuring channel 4 enter into the variable-pressure chamber 1.

2. The measuring channel 4 is filled with the liquid to be taken, and an excess liquid passes through the initial position of the measuring channel 4 to enter into the variable-pressure chamber 1.

3. When the piston 2 is located at the pressure relief port 8, the electric device 12 is turned off, and the connecting rod 3 stops driving the piston 2. The excess liquid does not enter into the variable-pressure chamber 1, and the initial measuring position is determined, Part of the liquid in the variable-pressure chamber 1 returns into the container body 13 through the pressure relief port 8 and the return channel 7.

4. When the liquid needs to be taken out, the electric device 12 is turned on, and the connecting rod 3 drives the piston 2 in the variable-pressure chamber 1 to move upward. The piston 2 moves across the pressure relief port 8 to isolate the variable-pressure chamber 1 from the outside world. At this time, a maximum volume of the liquid in the variable-pressure chamber 1 is not less than one-third total volume of the variable-pressure chamber.

5. The electric device 12 continues to drive the piston 2 to compress the variable-pressure chamber 1 by the connecting rod 3. A positive pressure is applied to the measuring channel 4, and the check valve 11 in the outflow channel 6 is opened. The air in the variable-pressure chamber 1 first enters into the measuring channel 4, and the liquid in the measuring channel 4 is pushed to flow out from the initial position. The positive pressure is continuously applied, so that the excess liquid in the variable-pressure chamber 1 enters into the measuring channel 4, and the liquid in the measuring channel 4 is pushed to continuously flow out.

6. An outflow volume is calculated by a distance moved by a liquid-air interface from the initial position in the measuring channel 4 since the beginning of the pressurization.

The measuring container is sensitive, convenient, fast and accurate.

Embodiment 4

Figure 5:
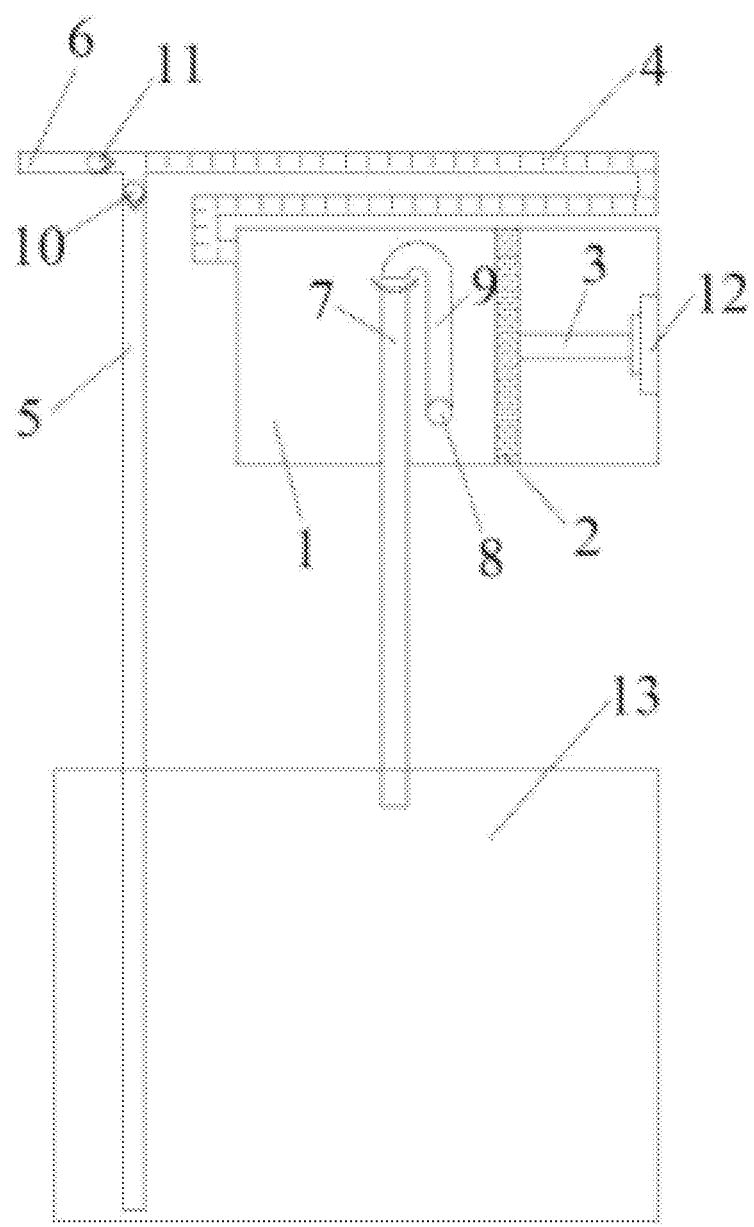
FIG. 5 is a structural diagram of a liquid container in Embodiment 4.

Embodiment 4 provides a container for liquid measuring and taking, as shown in FIG. 5. The container for liquid measuring and taking includes an initial positioning system composed of a variable-pressure chamber 1, a piston 2, a connecting rod 3, a measuring channel 4 and a pressure relief port 8. The container further includes an inverted J-shaped tube 9 connected outside the pressure relief port 8, a return channel 7, a liquid taking channel 5 and an internal check valve 10 thereof, an outflow channel 6 and an internal check valve 11 thereof, a container body 13, and an electric device 12 connected to the connecting rod 3.

The piston 2 is located at a right side of the variable-pressure chamber 1. The measuring channel 4 communicates with an upper left part of the variable-pressure chamber 1. The pressure relief port 8 is located at a lower part of a level of the variable-pressure chamber 1, and passes through a wall of the variable-pressure chamber 1. The piston 2 can move across the pressure relief port 8 to reach the right of the pressure relief port 8 when reciprocating. The inverted J-shaped tube 9 is connected outside the pressure relief port 8. When a level of a liquid in the variable-pressure chamber 1 is above than a higher end outlet of the inverted J-shaped tube 9, part of the liquid in the variable-pressure chamber 1 returns into the container body 13 through the pressure relief port 8 and the return channel 7, and air outside the variable-pressure chamber 1 enters into the variable-pressure chamber 1. The internal check valve 10 of the liquid taking channel 5 can be opened unidirectionally upward, and the internal check valve 11 of the outflow channel 6 can be unidirectionally opened leftward. The electric device 12 connected to the connecting rod 3 can be electrically controlled to drive the piston 2 to reciprocate by the connecting rod 3.

When the piston 2 is located at the pressure relief port 8 and the inside and outside of the variable-pressure chamber 1 are communicated, a maximum volume of the liquid in the variable-pressure chamber 1 is more than 90% total volume of the variable-pressure chamber. At this time, an air volume in the variable-pressure chamber 1 is small, and the liquid in the measuring channel 4 is sensitive to reciprocate along with the piston. The liquid flowing out from the pressure relief port 8 returns into the container body 13 through the inverted J-shaped tube 9 and the return channel 7. The measuring channel 4 has a scale to display an outflow volume of the liquid according to a distance moved by a liquid-air interface from an initial end of the measuring channel 4.

The measuring container measures and takes the liquid as follows:

1. When the piston 2 is located on the left of the pressure relief port 8, the electric device 12 is turned on. The connecting rod 3 drives the piston 2 to move rightward to generate a negative pressure in the variable-pressure chamber 1. The variable-pressure chamber 1 applies the negative pressure to the measuring channel 4 communicating with the upper left thereof. The check valve 10 is opened, and the liquid to be taken enters into the measuring channel 4 through the liquid taking channel 5. The air in the measuring channel 4 or the liquid and the air in the measuring channel 4 enter into the variable-pressure chamber 1.

2. The measuring channel 4 is filled with the liquid to be taken, and an excess liquid passes through the initial position of the measuring channel 4 to enter into the variable-pressure chamber 1.

3. When the piston 2 is located at the pressure relief port 8, the electric device 12 is turned off, and the connecting rod 3 stops driving the piston 2. The excess liquid does not enter into the variable-pressure chamber 1, and the initial measuring position is determined. The liquid with a level above an outlet height of the inverted J-shaped tube 9 in the variable-pressure chamber 1 returns into the container body 13 through the pressure relief port 8, the inverted J-shaped tube 9 and the return channel 7.

4. When the liquid needs to be taken out, the electric device 12 is turned on, and the connecting rod 3 drives the piston 2 in the variable-pressure chamber 1 to move leftward. The piston 2 moves across the pressure relief port 8 to isolate the variable-pressure chamber 1 from the outside world. At this time, a maximum volume of the liquid in the variable-pressure chamber 1 is not less than 90% total volume of the variable-pressure chamber 1.

5. The electric device 12 continues to drive the piston 2 to compress the variable-pressure chamber 1 by the connecting rod 3. A positive pressure is applied to the measuring channel 4, and the check valve 11 in the outflow channel 6 is opened. The air in the variable-pressure chamber 1 first enters into the measuring channel 4, and the liquid in the measuring channel 4 is pushed to flow out from the initial position. The positive pressure is continuously applied, so that the liquid in the variable-pressure chamber 1 enters into the measuring channel 4, and the liquid in the measuring channel 4 is pushed to continuously flow out.

6. An outflow volume is calculated by a distance moved by a liquid-air interface from the initial position in the measuring channel 4 since the beginning of the pressurization.

The measuring container is sensitive, convenient, fast and accurate.

Embodiment 5

Figure 6:
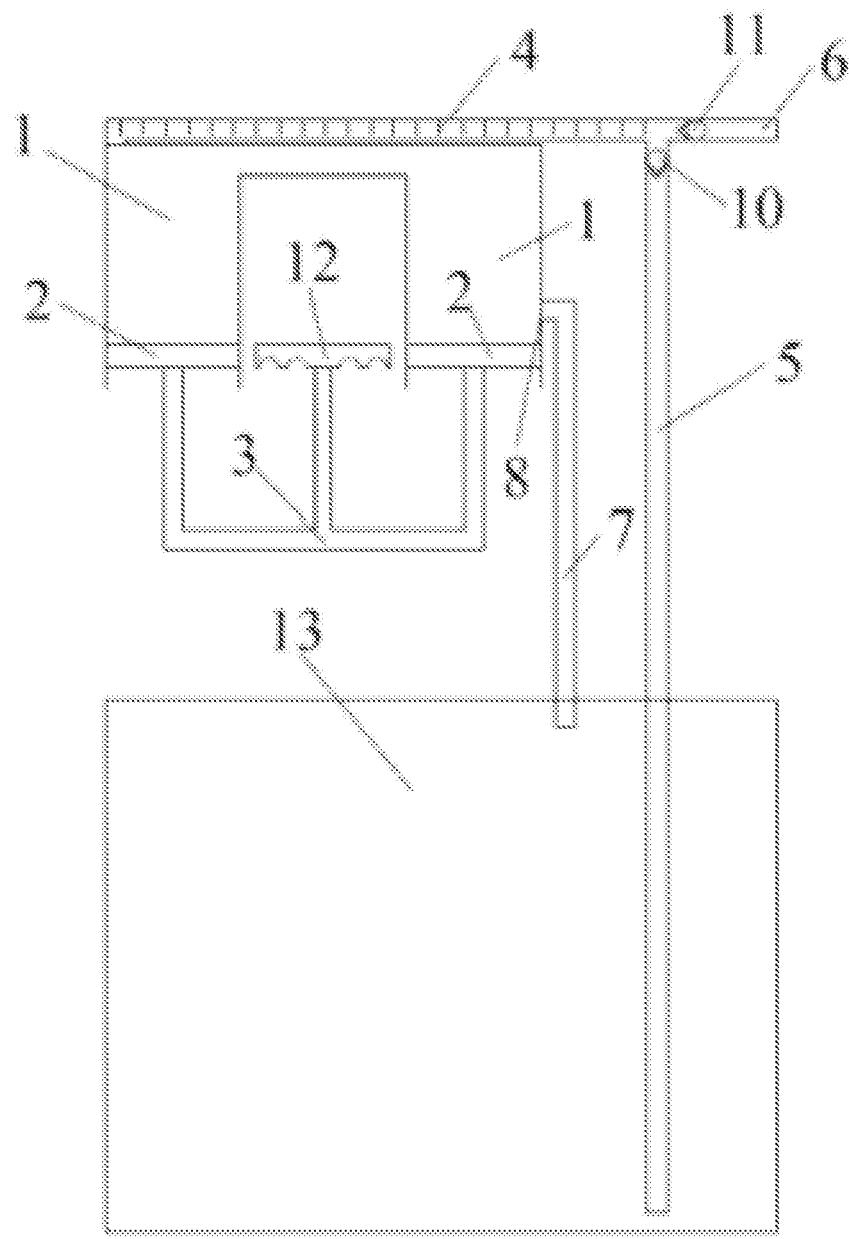
FIG. 6 is a structural diagram of a liquid container in Embodiment 5.

Embodiment 5 provides a container for liquid measuring and taking, as shown in FIG. 6.

The container for liquid measuring and taking includes an initial positioning system composed of a variable-pressure chamber 1, a piston 2, a connecting rod 3, a measuring channel 4 and a pressure relief port 8. The container further includes a return channel 7, a liquid taking channel 5, an outflow channel 6, a container body 13, and an operating rod 12 connected to the connecting rod 3.

The variable-pressure chamber 1 and the piston 2 are both two. The two variable-pressure chambers 1 are independent at the bottom and communicate with each other at an upper part. Each variable-pressure chamber is provided with a piston 2 at the bottom, which can move up and down therein. The connecting rod 3 connects the two pistons 2 and the operating rod 12. The measuring channel 4 communicates with the top of a left variable-pressure chamber 1. The pressure relief port 8 is located in a middle or lower part of a right variable-pressure chamber 1, and passes through a wall of the variable-pressure chamber 1. A right piston 2 can move across the pressure relief port 8 to reach blow the pressure relief port 8 when reciprocating. When the right piston 2 is located at the pressure relief port 8 and the inside and outside of the variable-pressure chamber 1 are communicated, as the liquid in the left variable-pressure chamber will not flow out, a maximum volume of a liquid in the two variable-pressure chambers 1 is more than one-third total volume of the variable-pressure chambers 1. A liquid overflowing from the pressure relief port 8 returns into the container body 13 through the return channel 7. The measuring channel 4 has a scale to display an outflow volume of the liquid according to a distance moved by a liquid-air interface from an initial end in the left of the measuring channel 4. An internal check valve 10 of the liquid taking channel 5 can be opened unidirectionally upward, and an internal check valve 11 of the outflow channel 6 can be unidirectionally opened rightward.

The measuring container measures and takes the liquid as follows:

1. When the right piston 2 is located above the pressure relief port 8, the operating rod 12 is pressed down. The connecting rod 3 drives the piston 2 to move downward to generate a negative pressure in the two variable-pressure chambers 1. The negative pressure is applied to the measuring channel 4 communicating with the top of the left variable-pressure chamber. The check valve 10 is opened, and the liquid to be taken enters into the measuring channel 4 through the liquid taking channel 5 and the check valve 10. Air in the measuring channel 4 or the liquid and the air in the measuring channel 4 enter into the variable-pressure chamber 1.

2. The measuring channel 4 is filled with the liquid to be taken, and an excess liquid passes through the initial position of the measuring channel 4 to enter into the variable-pressure chamber 1.

3. When the piston 2 is located at the pressure relief port 8, the operating rod 12 is stopped, and the connecting rod 3 stops driving the piston 2. The excess liquid does not enter into the variable-pressure chamber 1, and the initial measuring position is determined. The liquid with a level higher than the pressure relief port 8 in the right variable-pressure chamber 1 returns into the container body 13 through the pressure relief port 8 and the return channel 7.

4. When the liquid needs to be taken out, the operating rod 12 is pulled upward, and the connecting rod 3 drives the two pistons 2 in the variable-pressure chambers 1 to move upward. The piston 2 moves across the pressure relief port 8 to isolate the variable-pressure chamber 1 from the outside world. At this time, a maximum volume of the liquid in the variable-pressure chambers 1 is not less than one-third total volume of the variable-pressure chambers.

5. The operating rod 12 continues to drive the pistons 2 to compress the variable-pressure chambers 1 upward by the connecting rod 3. A positive pressure is applied to the measuring channel 4, and the check valve 11 in the outflow channel 6 is opened. The air in the variable-pressure chamber 1 first enters into the measuring channel 4, and the liquid in the measuring channel 4 is pushed to flow out from the initial position. The positive pressure is continuously applied, so that the liquid in the left variable-pressure chamber 1 enters into the measuring channel 4, and the liquid in the measuring channel 4 is pushed to continuously flow out.

6. An outflow volume is calculated by a distance moved by a liquid-air interface from the initial position in the measuring channel 4 since the beginning of the pressurization.

The measuring container is sensitive, convenient, fast and accurate.

Although the embodiments of the present invention are described, it should be understood that those of ordinary skill in the art may make various changes, modifications, replacements, variations and combinations to the above embodiments without departing from the essential of the invention shall all fall within the protection scope of the invention.

What is claimed is:

1. An initial positioning system for liquid measuring and taking, comprising a measuring channel, a variable-pressure chamber and a piston, wherein an initial end of the measuring channel communicates with an upper part of the variable-pressure chamber; the piston reciprocates in the variable-pressure chamber to generate a positive pressure alternating with a negative pressure in the variable-pressure chamber;

the initial positioning system further comprises a pressure relief port located on a wall of the variable-pressure chamber and communicating with the outside of the variable-pressure chamber; the pressure relief port is provided with a valve opened under a certain pressure; the piston can move across the pressure relief port when reciprocating;

when the piston is located at the pressure relief port and the inside and outside of the variable-pressure chamber are communicated, a maximum volume of a liquid in the variable-pressure chamber is not less than one-third total volume of the variable-pressure chamber;

when the piston moves outward to generate a negative pressure in the variable-pressure chamber, a liquid in the measuring channel flows toward the variable-pressure chamber and passes through the initial position to enter into the variable-pressure chamber; when the piston is at or over the pressure relief port, air outside the variable-pressure chamber enters into the variable-pressure chamber from the pressure relief port;

when the piston moves inward across the pressure relief port to generate a positive pressure in the variable-pressure chamber, the liquid in the measuring channel flows outward, and air in the variable-pressure chamber or the air and the liquid in the variable-pressure chamber enter into the measuring channel;

an outflow volume of the liquid is calculated by a distance moved by a liquid-air interface from the initial position since the beginning of the positive pressure.

2. The initial positioning system for liquid measuring and taking according to claim 1, wherein there is one variable-pressure chamber, and the piston is located on a level side or an oblique lower side of the variable-pressure chamber.

3. The initial positioning system for liquid measuring and taking according to claim 2, wherein the pressure relief port is located at a middle or upper part of a level of the variable-pressure chamber.

4. The initial positioning system for liquid measuring and taking according to claim 1, wherein the pressure relief port communicates with a tube opened outside the variable-pressure chamber; the other end of the tube is opened at a level of the middle or upper part of the variable-pressure chamber.

5. The initial positioning system for liquid measuring and taking according to claim 1, wherein the variable-pressure chamber is two or more, and the piston is located on a lower side or an oblique lower side of the variable-pressure chamber.

6. The initial positioning system for liquid measuring and taking according to claim 5, wherein one of the variable-pressure chambers is provided with the pressure relief port.

7. The initial positioning system for liquid measuring and taking according to claim 1, wherein when the piston is located at the pressure relief port and the inside and outside of the variable-pressure chamber are communicated, a maximum volume of the liquid in the variable-pressure chamber is not less than one-third total volume of the variable-pressure chamber; further, when the piston is located at the pressure relief port and the inside and outside of the variable-pressure chamber are communicated, a maximum volume of the liquid in the variable-pressure chamber is not less than 90% total volume of the variable-pressure chamber.

8. A measuring tool or container, comprising the initial positioning system for liquid measuring and taking according to claim 1.

* * * * *